Figure 1:
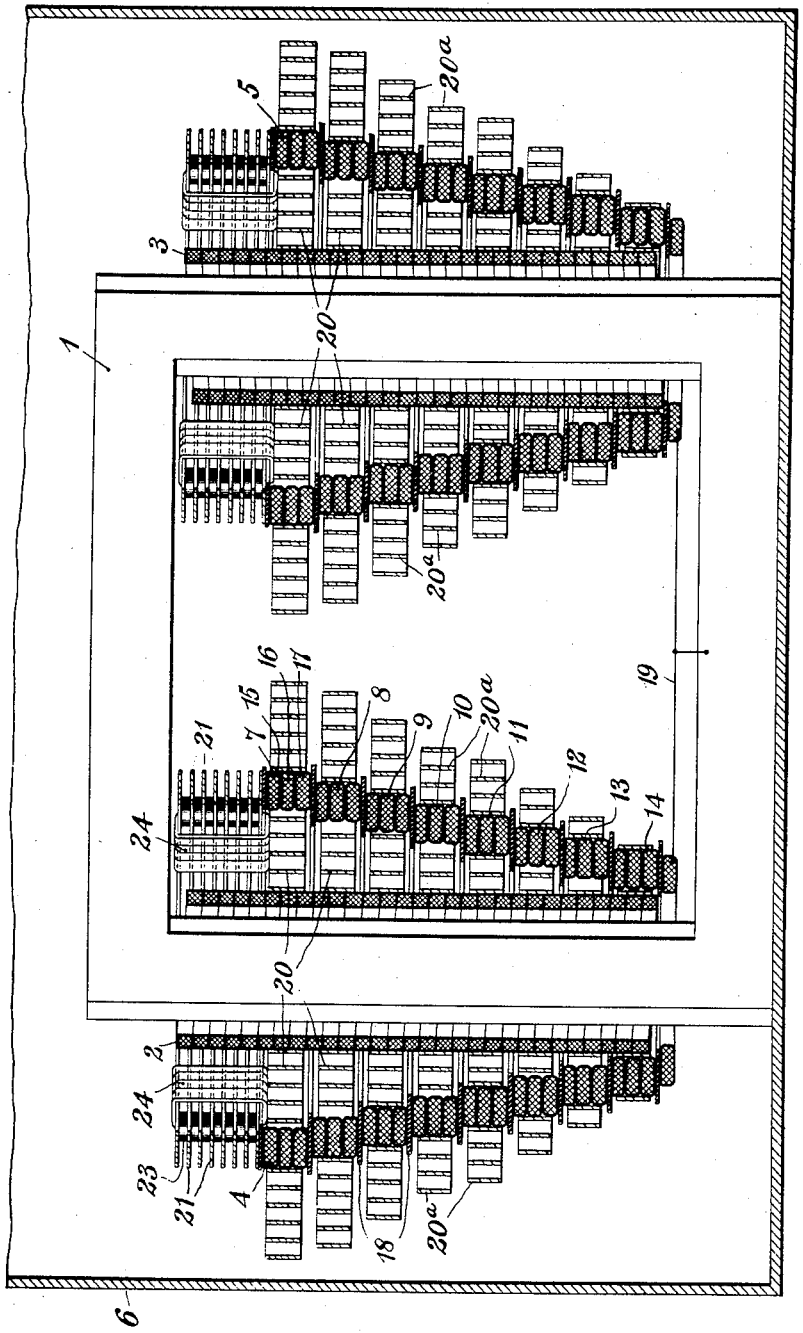

H. B. SMITH.
ELECTRICAL APPARATUS.
APPLICATION FILED JAN. 10, 1908.

1,062,046.

Patented May 20, 1913.
5 SHEETS—SHEET 1.

WITNESSES:
C. L. Belcher

INVENTOR.
Harold B. Smith
BY
Wesley G. Carr
ATTORNEY

H. B. SMITH.
ELECTRICAL APPARATUS.
APPLICATION FILED JAN. 10, 1908.

1,062,046.

Patented May 20, 1913.
5 SHEETS—SHEET 2.

WITNESSES:
C. L. Belcher
R. J. Dearborn

INVENTOR
Harold B. Smith
BY
Wesley G. Carr
ATTORNEY

H. B. SMITH.
ELECTRICAL APPARATUS.
APPLICATION FILED JAN. 10, 1908.

1,062,046.

Patented May 20, 1913.
5 SHEETS—SHEET 4.

WITNESSES:
C. L. Belcher

INVENTOR
Harold B. Smith
BY
ATTORNEY

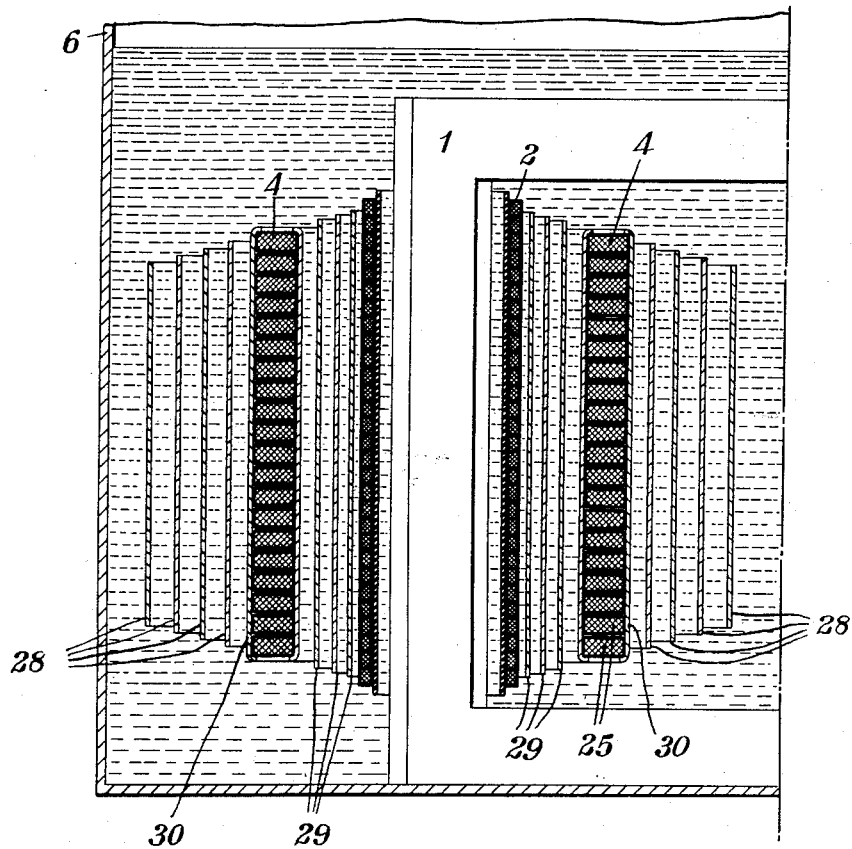

UNITED STATES PATENT OFFICE.

HAROLD B. SMITH, OF WORCESTER, MASSACHUSETTS, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRICAL APPARATUS.

1,062,046.

Specification of Letters Patent.    Patented May 20, 1913.

Application filed January 10, 1908. Serial No. 410,155.

*To all whom it may concern:*

Be it known that I, HAROLD B. SMITH, a citizen of the United States, and a resident of Worcester, in the county of Worcester and State of Massachusetts, have invented a new and useful Improvement in Electrical Apparatus, of which the following is a specification.

My invention relates to electrical apparatus and it has special reference to transformers.

One object of my invention is to provide a device of the class above indicated that shall be simple and durable in construction and adapted for connection to electric circuits of very high voltage.

Another object of my invention is to so improve the insulation of the windings that the space occupied by the entire device and the cost of its construction for any predetermined very high voltage may be materially reduced.

It is usual to immerse the core structures and windings of high-voltage electrical apparatus in an insulating fluid, such as oil, in order that proper electrical separation may be maintained between the current-conducting parts and the magnetizable core structure, and in order that the core and windings may be kept comparatively cool. As higher and higher voltages have been employed, transformers and similar devices have been provided with greater insulating spaces until such devices have attained very large dimensions. It has been observed that a certain distance in oil or a film of oil of a certain thickness will sustain or insulate for a predetermined voltage, but that, as the voltage is raised, the length of oil distance required increases at a greater rate. Considerable advantage may be obtained by employing solid insulating barriers of high dielectric strength under certain conditions, provided the specific inductive capacity of each barrier is substantially the same as that of the oil.

According to my present invention, I provide an improved insulation which still further reduces the space occupied by a transformer or other electrical device and adapts it for the production of potentials far in excess of any heretofore obtained and in which the insulating barriers of the prior art are replaced by plates or barriers of conducting material to form a series of condensers. The arrangements of parts and the theory involved in the application of the condenser to the insulation of transformer cores are hereinafter more fully pointed out.

A better comprehension of the existing relations may be obtained by reference to the following statements, some of which are merely reiterations of facts well known to those skilled in the art: 1. In a series of condensers, the same current value exists throughout the entire series circuit and for each part of it. 2. If several condensers of equal capacity are connected in series, the difference of potential around the terminals of any one condenser is the same as that around the terminals of each of the others. 3. If a conductor of circular cross section is surrounded by a cylindrical metal sheath which is separated from it by a uniform thickness of dielectric, the electrostatic flux is of uniform value across and normal to any cylindrical surface co-axial with the conductor. 4. The electro-static density is therefore greatest at such cylindrical surface having the smallest radius, *i. e.;* at the surface of the conductor. 5. If the flux density produces a potential gradient at the surface of the conductor in excess of the dielectric strength of the insulating medium, the insulating layer adjacent to the conductor is broken down and the supporting strength of this layer being subtracted from the remainder of the insulating mass, the latter is weakened and the process of break-down proceeds until the rupture becomes complete between the conductor and the sheath. 6. According to insulating methods ordinarily employed, the thickness of the entire insulating wall is increased or the dielectric of the material improved until the dielectric strength of the mass, as a whole, is capable of withstanding the total potential applied. 7. It follows from the above statement that, although the inner layer or layers of the dielectric are worked at a potential gradient approaching their dielectric strengths, and usually with a relatively small factor of safety, the outer layers which constitute by far the larger volume of insulating material are worked at a low potential gradient and therefore inefficiently. 8. The dielectric strength of air follows straight line laws while that of oil and solid dielectrics does not, hence it is important to maintain uniformly efficient values for the potential gradient for oil and solid dielectrics and to subdivide them into layers of equal electrostatic densities.

My invention is illustrated in the accompanying drawings in which—

Figure 2:
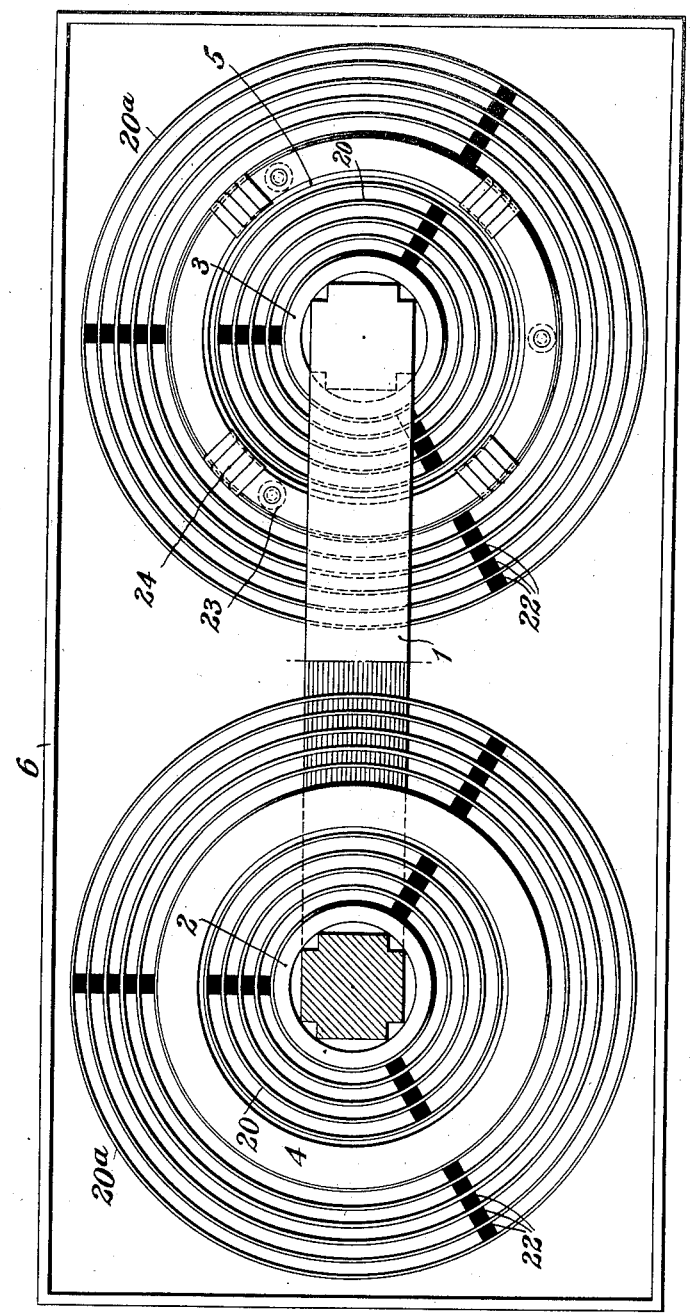
Figure 3:
Figure 4:
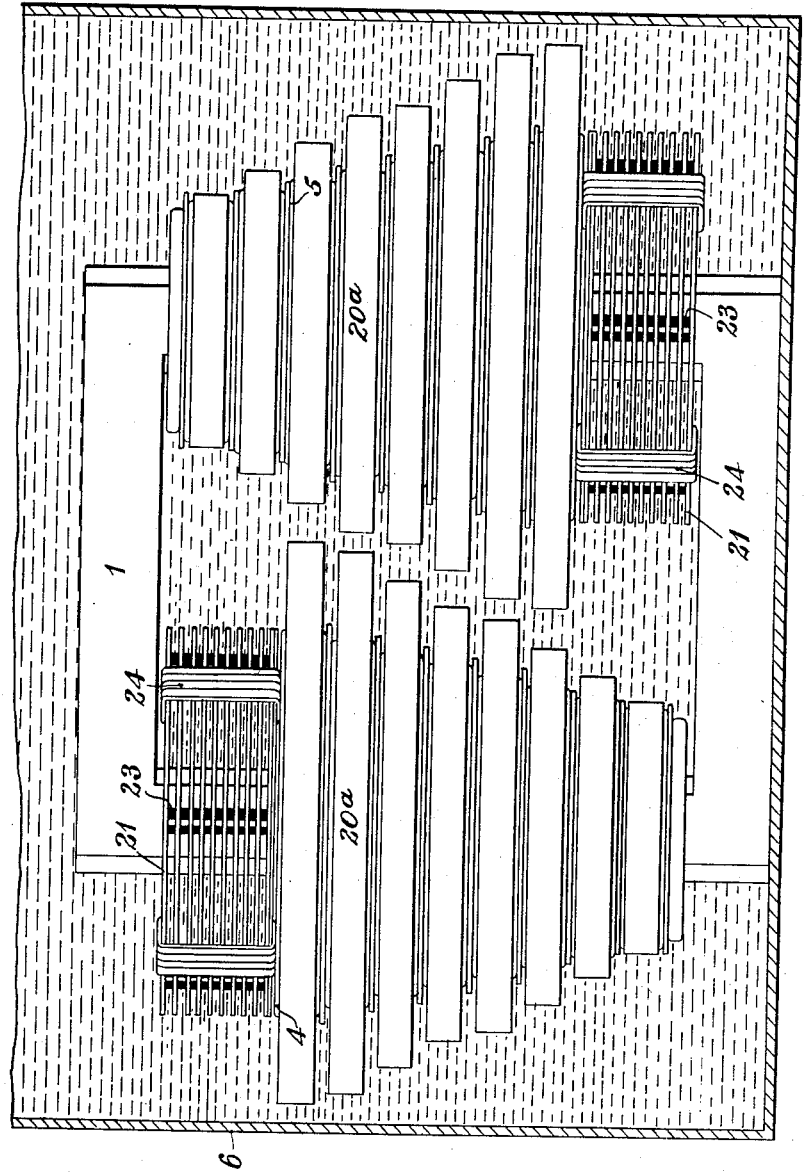
Figure 5:
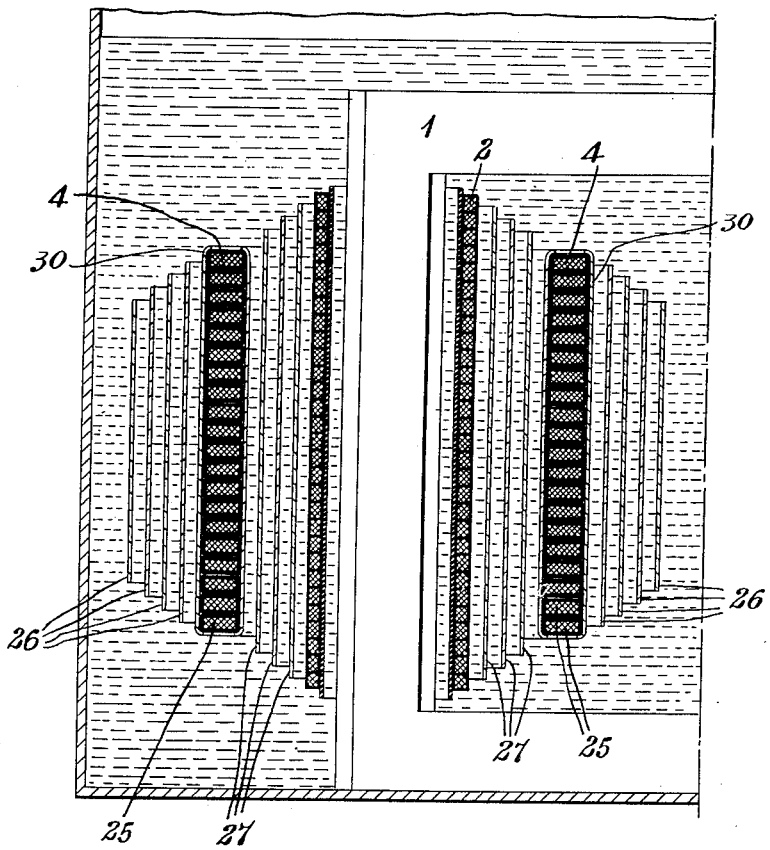
Figure 6:
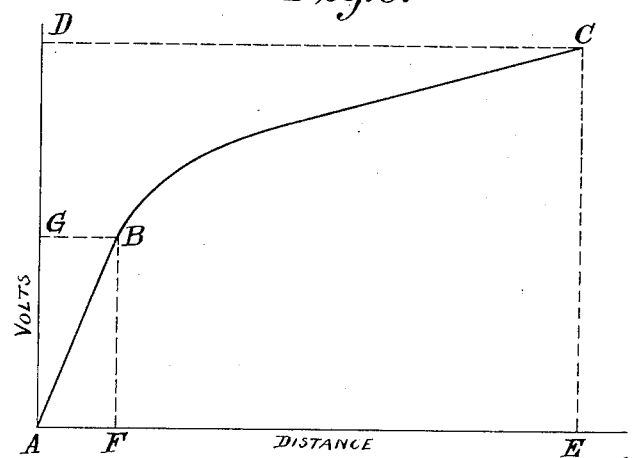

Figure 1 is a sectional view of a transformer constructed in accordance therewith. Fig. 2 is a plan view of the device shown in Fig. 1 and Fig. 3 is a detail view of one of the spacing disks of Figs. 1 and 2. Fig. 4 is an elevation of a transformer having a modified arrangement of winding coils whereby the space occupied by the coils and the size of the magnetizable core member may be reduced. Fig. 5 is a sectional view of a portion of a transformer, the windings of which are protected by an arrangement of barriers of conducting material immersed in insulating fluid, which may be substituted for the arrangement of Fig. 1, and Fig. 6 is a typical curve showing the break-down dielectric strength of oil or solid dielectrics, the oil distance or the thickness of a film of oil or thin layer of solid dielectric being plotted against the voltage which it will sustain. Fig. 7 is a view corresponding to Fig. 5 of another modification embodying my invention.

Referring to the drawings, special attention is first directed to Fig. 6, which shows a curve of breakdown dielectric strength of oil or solid dielectric and which clearly indicates the desirability of subdividing oil into layers of approximately equal electro-static flux densities and sustaining approximately equal potential differences which shall be below the bend in the curve in order to obtain efficient insulation. The statement 8 included above may be demonstrated by reference to the curve of Fig. 6 which has the general form A—B—C, volts being plotted against the distance in, or thickness of the dielectric. In order to insulate for a given potential D, using oil, or other material of which the curve is representative, in bulk, a distance or thickness of dielectric A—E must be used. If, however, two equal condensers or capacities be connected in series and their junction be electrically connected to a metal plate having on each side a thickness A—F of oil, this combination may be used for insulating a potential of $2^x$ A—G on each side of the combination of capacities which is equivalent to A—D volts. Consequently, it may be observed that a thickness of oil $2^x$ A—F is now required instead of a thickness A—E. By proper subdivision and arrangement, the distance or thickness $2^x$ A—F may be a small fraction of A—E. It has been determined that the dielectric strength of air follows straight line laws but, the curve of Fig. 6 shows that the dielectric strengths of oil and solid dielectrics do not. The advantages of oil insulation are well known and it has been my aim to retain all of the known advantages and to obtain, in addition, a material reduction in the aggregate oil distances required for the insulation of very high voltages by employing, in combination with the oil, barriers of metal condenser plates to take a large proportion of the potential strain and to distribute it economically through the oil.

Referring now to Figs. 1, 2, and 3 which illustrate an embodiment of my invention but are not intended to restrict the application of its principles or to limit the scope of the appended claims; the device illustrated comprises a stationary core member 1 having secondary coils 2 and 3 and primary windings 4 and 5, and an inclosing casing 6 in which the core and windings are disposed. The core is shown as substantially square, though it may be of elongated rectangular or cruciform shape in cross section, and the windings are disposed on two opposite legs, the low voltage coils being close to the core member and the high voltage coils being concentrically disposed around the low voltage coils. The secondary coils 2 and 3 may obviously be omitted and the primary coils used in a single-winding transformer within the spirit and scope of my invention. The primary windings 4 and 5 are similar to each other so that only one will be described in detail. Winding 4 comprises a plurality of groups of coils 7, 8, 9, 10, 11, 12, 13, and 14 of different diameters according to the differences of potential between them and the magnetizable core 1. Each group comprises three coils 15, 16, and 17, which are preferably of the pancake type and are constructed of strap conductor wound on edge, but the number of coils per group and the type of coil may be varied to suit existing conditions of voltage and current. The groups are separated from each other by annular insulating plates 18, which may or may not include metal capacity plates 18ª. The end coils of smallest radius are connected to each other and to the core structure by a conductor 19 so that no special protection further than that provided by the insulating coverings of the coils and the insulating fluid in which the device is immersed is necessary. It is sometimes not advisable to connect the high voltage winding to ground and, in such cases, adequate insulation must be provided.

The coils of largest radius must be electrically separated from the core structure in every direction by an insulating medium which is capable of withstanding strains imposed by very great differences of potential. In order that this may be accomplished within a minimum amount of space, I have provided a plurality of concentric cylinders 20 constructed of sheet metal or other suitable conducting material, which may be spaced at substantially equal intervals in the oil between the secondary coil 2 and the primary group 7, or at predetermined unequal intervals as shown in Fig. 7 to provide suitable capacity for desirable electro-static flux or potential distribution. Another group of concentric cylinders 20ª is located on the outside of each coil group, the aggregate space occupied by the two groups being substantially equal when measured on a radial line. The space occupied by the cylinders pertaining to the coil groups of small radius is less than for the larger coils and the number and lengths of the cylinders may be different. A plurality of annular plates 21 of conducting material are interposed between the coil group 7 and the leg of the core which is adjacent to the one surrounded by the coil. The cylinders 20 and 20ª may be supported from the coil groups themselves by means of a pluarlity of spacing blocks 22 of insulating material which may be arranged in groups and on radial lines. The annular plates 21 are spaced by insulating spacing rings 23 which may be replaced by any suitable means, and their relative position is maintained by wrappings of tape 24 located at intervals around the circumference of the groups of plates or by other suitable means.

The tank 6 in which the transformer is located is preferably filled with oil, or other suitable insulating liquid having similar characteristics, as shown in Figs. 4 and 5, so that the heat generated in the coils may be conducted to the walls of the tank and, when the device is submerged, the cylinders 20 and 20ª and the plates 21 form series of condensers which are capable of sustaining or insulating for a very high voltage relative to the aggregate oil space or fluid space between the parts which it separates.

It may be desirable, in some cases, in order to be more economical of the space occupied by the transformer in the tank, to reverse one of the high voltage windings 4 and 5, as shown in Fig. 4, so that the coil of greatest radius on one leg of the core may be directly opposite the coil of smallest radius on the other. The smallest coils, will, of course, be connected together and to the core structure, in either event, if it is desired to ground the winding at any point.

It will undoubtedly be desirable in many cases to employ high voltage coils of uniform diameter (see Fig. 5) in place of those of increasing diameters shown in Figs. 1 and 4 of the drawings and particularly if the center of the high tension winding is not connected to ground. Referring particularly to Fig. 5, the high voltage winding comprises a plurality of coils 25 of substantially equal diameters, which are protected by concentric conducting cylinders 26 and 27, the coils and cylinders being immersed in oil. The areas of the conducting cylinders are preferably equal so that their lengths vary as shown.

The metal cylinders adjacent to the coils are preferably in contact with the insulating wrapping of the coil group as shown in Figs. 5 and 7, although this arrangement is not essential and the arrangement of Fig. 1 may be employed. By this means mechanical strength and protection are afforded, and for particularly high voltage work, the high tension coils may be nearly surrounded by a metallic sheath or armor 30 not only for the purpose of mechanical strength and protection from electrical discharge or short circuit but also as a means of protection against the development of electric brush or corona formation whether under oil or not.

In Fig. 7, concentric conducting cylinders 28 and 29 which correspond to cylinders 26 and 27 of Fig. 5 are unequally spaced and they are more nearly of the same length. It is obviously possible by properly spacing the cylinders to maintain an equality between the condensers constituted by them even if the cylinders are of equal lengths.

The legs of the core members, on which the windings are located, may be notched at their edges in a well known manner in order to reduce the inside diameter of a secondary coil which is adapted for use with a core of a given area.

It will be understood that my improved voltage-sustaining or insulating structure may be adapted for, and applied to, other electrical devices, and I desire that only such limitations shall be imposed as are indicated in the appended claims.

I claim as my invention:

1. In electric apparatus, the combination with current-conducting coils immersed in an insulating fluid, of a plurality of barrier plates of conducting material disposed in parallel planes adjacent to the coils, said plates being immersed directly in the insulating fluid and constituting a series of condensers of equal capacity.

2. In a transformer, the combination with a magnetizable core member, current-carrying coils, and a fluid-containing tank in which said parts are located, of barrier-plates of conducting material immersed directly in the insulating fluid and disposed in parallel planes between the coils, and the magnetizable core member to constitute series of condensers of equal capacity.

3. In a transformer, the combination with a substantially rectangular magnetizable core member, a current-conducting coil that surrounds one leg of the core and is materially separated from the adjacent leg, and a liquid-containing tank in which the magnetizable core is located, of a plurality of tubular barriers of conducting material immersed directly in the insulating liquid and disposed one within another between the coil and the core leg which it surrounds to constitute a series of equal-capacity condensers in connection with the insulating liquid contained within the tank.

4. In a transformer, the combination with a substantially rectangular magnetizable core member, a current-conducting coil that surrounds one leg of the core and is materially separated from the adjacent leg, and a fluid-containing tank in which the magnetizable core is located, of a plurality of tubular barriers of conducting material disposed one within another between the coil and the core leg which it surrounds to constitute a series of equal capacity condensers solely in connection with the insulating fluid contained within the tank.

5. In a transformer, the combination with a magnetizable core member, a substantially cylindrical large-current winding surrounding the core, a high-voltage winding of materially larger mean diameter of turn surrounding the secondary winding, and a liquid-containing tank in which the core and winding are located, of substantially cylindrical sheet metal barrier-tubes which are interposed between the high-voltage and large-current windings and divide the insulating liquid in which the parts are immersed to provide alternate films of insulating and conducting material.

6. In a transformer, the combination with a magnetizable core member and a current-conducting winding encircling the core, of a plurality of parallel barries of bare conducting material separated by fluid insulation and interposed between the winding and the core to constitute a series of equal-capacity condensers.

7. In a transformer, the combination with a magnetizable core member and a current-conducting winding encircling the core, of a plurality of cylindrical barriers of bare conducting material separated by fluid insulation and interposed between the winding and the core, said barriers being substantially concentric and of equal surface areas.

8. In a transformer, the combination with a magnetizable core member, and a substantially cylindrical current-conducting winding encircling the core, of a plurality of cylindrical barriers of conducting material concentric with the winding and disposed within and around said winding, all of said parts being immersed in insulating fluid.

In testimony whereof, I have hereunto subscribed my name this twenty third day of December, 1907.

HAROLD B. SMITH.

Witnesses:
 JOHN W. MAWBEY,
 E. BERT JOHNSON.